(12) United States Patent
Filip et al.

(10) Patent No.: US 8,933,929 B1
(45) Date of Patent: Jan. 13, 2015

(54) TRANSFER OF ANNOTATIONS FROM PANAROMIC IMAGERY TO MATCHED PHOTOS

(75) Inventors: Daniel J. Filip, San Jose, CA (US); Daniel Cotting, Islisberg (CH)

(73) Assignee: Google Inc., Mountain View, CA (US)

(*) Notice: Subject to any disclaimer, the term of this patent is extended or adjusted under 35 U.S.C. 154(b) by 414 days.

(21) Appl. No.: 13/342,718

(22) Filed: Jan. 3, 2012

(51) Int. Cl.
*G06T 15/00* (2011.01)
*G06K 9/32* (2006.01)
*G06F 17/30* (2006.01)

(52) U.S. Cl.
CPC ............ *G06K 9/32* (2013.01); *G06F 17/30241* (2013.01)
USPC ............ 345/419; 345/629; 348/62; 382/154; 701/436; 707/722

(58) Field of Classification Search
CPC ............................. G06K 9/32; G06F 17/30241
USPC ................... 345/419, 629; 348/62; 382/154; 701/436; 707/722
See application file for complete search history.

(56) References Cited

U.S. PATENT DOCUMENTS

| | | | |
|---|---|---|---|
| 8,428,873 B2* | 4/2013 | Chau et al. | 701/436 |
| 8,515,159 B2* | 8/2013 | Snavely et al. | 382/154 |
| 8,548,990 B2* | 10/2013 | Bennett et al. | 707/722 |
| 8,605,141 B2* | 12/2013 | Dialameh et al. | 348/62 |

OTHER PUBLICATIONS

Snavely, N., et al., "Modeling the World from Internet Photo Collections," *Int. J. Comput. Vision* 80(2):189-210, Kluwer Academic Publishers, Hingham, MA (Nov. 2008).
Luo, J., et al., "Geotagging in multimedia and computer vision—a survey," Springer Science + Business Media, LLC, 187-211 (Oct. 19, 2010).
Snavely, N., et al., "Photo Tourism: Exploring Photo Collections in 3D," ACM Transactions on Graphics (TOG) SIGGRAPH 2006, vol. 25, Issue 3, Jul. 2006.

* cited by examiner

*Primary Examiner* — Phu K Nguyen
(74) *Attorney, Agent, or Firm* — Lerner, David, Littenberg, Krumholz & Mentlik, LLP

(57) ABSTRACT

Systems and methods are disclosed for transferring information metadata from a first digital image to a second digital image. In one embodiment, an assignment module is configured to assign a corresponding portion of the first image to the second image using geolocation data. An extraction module is configured to extract a collection of features associated with the second image and the corresponding portion of the first image. An alignment module is configured to align the second image with a portion of the first image by transforming the second image so that features associated with the second image are geometrically aligned with the corresponding features of the portion of the first image. A metadata module is configured to associate metadata from the portion of the first image with the transformed second image. An annotation module is configured to annotate the second image with the associated metadata to generate an annotated image.

20 Claims, 4 Drawing Sheets

TRANSFER OF ANNOTATIONS FROM PANAROMIC IMAGERY TO MATCHED PHOTOS

BACKGROUND

1. Field

This disclosure generally relates to digital image processing.

2. Background Art

Recent advances in computer networking and image processing have led to widespread availability of street-level, aerial, and satellite imagery on the World Wide Web. Much of this imagery is systematically gathered through large-scale efforts making a wealth of high quality digital imagery accessible to users of desktop as well as mobile computing devices.

Currently, a number of online map systems provide digital imagery that complements and is integrated with detailed map information. Some systems provide imagery that changes scale and resolution as a user requests scale and resolution changes of the corresponding map. Often, digital imagery is provided with metadata including annotations designating points of interest such as businesses, landmarks, streets, etc. Images can also be provided with other information of interest such advertisements, distances, and directions.

Some of the imagery provided to end users is in the form of panoramas. Panoramas are generated by computationally "stitching together" digital images from collections of images. The process of acquiring panoramic imagery, stitching it together to make panoramic images, and providing markers to enhance map data, is expensive and time consuming. Systems are therefore only updated periodically. As a result, imagery containing metadata markers tends to become quickly outdated as objects in the environment change with time (e.g., due to construction, business relocations, etc.). Metadata includes any information that may be associated with an image such as markers indicating businesses, landmarks, and other points of interest.

Some map systems provide a partial solution to this problem by allowing users to upload recent images to replace parts of the panoramic imagery that are outdated. Unfortunately, however, newly uploaded images generally do not contain the markers and other metadata of the existing panoramic imagery.

BRIEF SUMMARY

A system, computer-implemented method, and computer readable medium are disclosed, for transferring information metadata/markers from a first image to a second image. In an embodiment, a computer-implemented system is disclosed for associating metadata from a first digital image with a second digital image. The system includes an assignment module, an extraction module, an alignment module, a metadata module, and an annotation module. The assignment module is configured to assign a corresponding portion of the first image to the second image using geolocation data. The extraction module is configured to extract a collection of features associated with the second image and the corresponding portion of the first image. The alignment module is configured to align the second image with the portion of the first image by transforming the second image to geometrically align the collection of features of the second image with the corresponding collection of features of the portion of the first image. The metadata module is configured to associate metadata from the portion of the first image with the transformed second image. The annotation module is configured to annotate the second image with the associated metadata to generate an annotated image.

Further features and advantages as well as the structure and operation of various embodiments are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and together with the description further serve to explain the principles of the invention and to enable a person skilled in the pertinent art(s) to make and use the invention.

Figure 1:
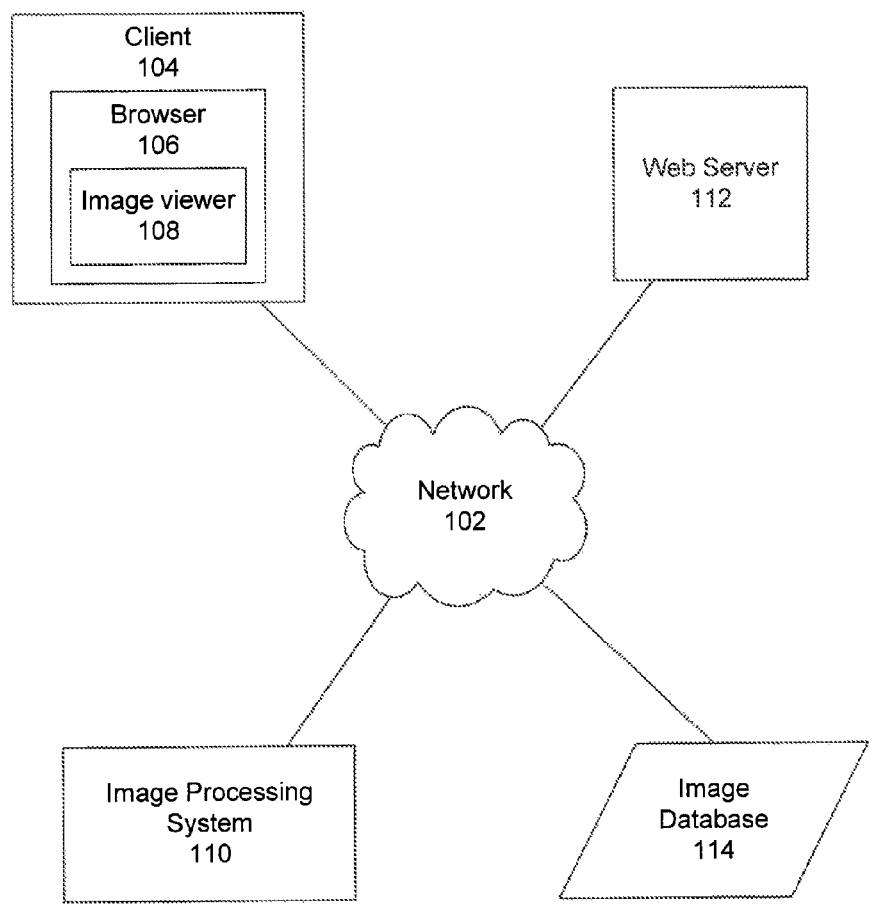
FIG. 1 is a block diagram of a distributed system in which embodiments can be implemented.

Embodiments are described below with reference to the accompanying drawings. In the drawings, like reference numbers generally refer to identical or functionally similar elements. Additionally, the leftmost digit(s) of a reference number generally identifies the drawing in which the reference number first appears.

DETAILED DESCRIPTION

This disclosure is directed to systems, methods, and computer readable media, for transferring information markers and other metadata from panoramic imagery to related photos. Metadata includes information associated with imagery such as designations of businesses, landmarks and other points of interest. Such metadata is indicated by placing markers on images to denote locations of interest. A marker can be simply a label or may be a hyperlink that can direct a user to further information about a point of interest. It is noted that reference in this specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic, is described in connection with an embodiment, it is submitted that it is within the knowledge of one skilled in the art to effect such feature, structure, or characteristic, in connection with other embodiments whether or not explicitly described.

The following detailed description refers to the accompanying drawings that illustrate exemplary embodiments consistent with this invention. The detailed description is not meant to limit the invention, but rather, the scope of the invention is defined by the appended claims.

Several online map systems currently provide users with panoramic imagery to complement map data. The panoramic imagery is typically enhanced with metadata that provides useful information such as street and business names, names of landmarks, and other points of interest. Unfortunately, the imagery in such map systems tends to become quickly outdated as objects in the environments change.

As a solution to this problem, certain map systems provide functionality so that users can upload their own, more recent, digital images. The uploaded digital images can automatically be posed relative to the matching panoramas using computer vision techniques. In this way, the uploaded user photos help to keep the panoramic imagery current. Current systems, however, lack functionality to allow the metadata to be transferred from the panoramic imagery to the uploaded user imagery.

Disclosed embodiments solve this problem by providing systems and methods that use computer vision techniques to match an individual image to a portion of a panorama and to transfer information markers from the panorama to the matched image. Once a match has been found between an uploaded image and a matching portion of the panorama, it is possible to navigate between the two images. Thus, when a user selects a matched image, they will also have access to the metadata, such as business names, street names, etc., from the panorama.

Panoramic images can be associated with geolocation data. Such data can include the latitude, longitude, height, and depth of objects in the image. A depth map is a function of the two-dimensional (x, y) position coordinates of an image that gives the distance from an observer to a particular (x, y) point in the image.

The geolocation data and depth map provide a means for placing 3D markers in the proper locations on a panoramic image. An uploaded user image can be matched to a portion of panorama using computer vision techniques. Once a 2D image (e.g., an image provided by a user) is properly matched to a portion of a panorama, the metadata from the panorama can be associated with the 2D image. The procedure is summarized briefly as follows.

In the first stage, the 2D image is assigned to a corresponding portion of the panorama using geolocation data. Further processing of the 2D image, however, may still be required in order to align the 2D image with the corresponding portion of the panorama. Using computer vision techniques, a collection of features is extracted from the 2D image and the corresponding portion of the panorama and a search is done to find a collection of matching features. Then the 2D image is transformed so as to align the matching features of the 2D image with the portion of the panorama. The transformation of the 2D image can be a homography transformation. The metadata/markers can then be properly associated with the transformed 2D image.

FIG. 1 is a block diagram of a client/server environment 100 in which embodiments of the present invention, or portions thereof, can be implemented. Client/server environment 100 can include one or more networks 102, web servers 112, and clients 104.

Network 102 can be any network or combination of networks that can carry data communications. Such a network 102 can include, but is not limited to, a local area network, a metropolitan area network, and/or a wide area network, such as the Internet. A network 102 can support technologies including, but not limited to, the World Wide Web ("the web") that provide access to services and applications using protocols such as Hypertext Transfer Protocol (HTTP). Intermediate web servers, gateways, or other servers can be provided between the components of systems shown in FIG. 1, depending on a particular application or environment.

Client 104 can be an electronic device that is under the control of a user and is capable of requesting and receiving resources over a network 102. Examples of client devices 104 include personal computers, mobile communications devices, tablet computers, etc. A client device 104 typically includes an application such as a web browser ("browser") 106. Browser 106 can also include an image viewer program 108. Images can be stored locally on the client device 104 or can be stored in an image database 114 that is accessed through the network 102. Client/server environment 100 can also include various image processing systems 110. Image processing systems 110 can exist on the client device 104, a web server 112, or at other network locations.

Web server 112 is a computing device, or an application executed on a computing device. A web server 112 delivers resources to client 104. A data object is any data that can be provided over a network 102. A resource is identified by a resource address that is associated with each resource. Resources include HTML pages, word processing documents, and portable document format (PDF) documents, images, video clips, feed sources, etc. The resources can contain content such as words, phrases, images, and sounds that can include embedded information such as meta information in Hypertext and/or embedded instructions (such as, JavaScript™ scripts).

Image viewer 108 is an example of an application that can be downloaded by client 104 and viewed using browser 106. Image viewer 108 can be hosted on web server 112 and can be accessed by client 104 using a resource address. When image viewer 108 is downloaded onto client 104, the image viewer allows the client 104 to display images of a geographic location on a browser 106.

An image viewer 108 in some embodiments can display images of many geographic locations. For example, an image viewer 108 can display street-level, aerial, or satellite imagery of cities, landmarks, street corners, museums, etc. The image viewer 108 can obtain images of geographic locations from image database 114. In some systems, a user viewing a map can request corresponding imagery by positioning a cursor on a particular location on the map. Image viewer 108 can convert the (x, y) coordinates corresponding to the cursor location into geographic (longitude and latitude) coordinates. These coordinates can then be sent to the image database 114 for retrieval of appropriate imagery.

In certain embodiments, street-level images in database 114 are gathered by a moving vehicle using a cluster of cameras pointed in various directions. Further embodiments can also be equipped with laser sources and sensors to detect distances from the cameras to objects appearing in the images. Depth maps for various images can be constructed from such laser data. Further embodiments can include a GPS device to obtain longitude and latitude as well as height information (i.e., altitude) associated with acquired images. By combining the GPS data with the depth map, a full 3D model corresponding to panoramic imagery can be generated.

Figure 2:
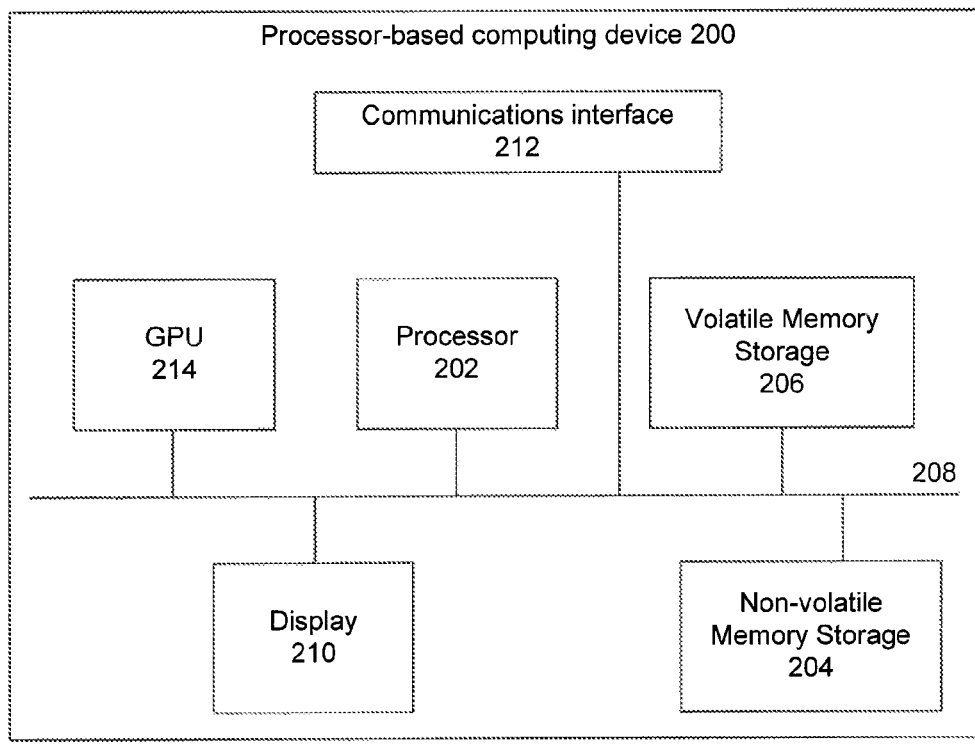
FIG. 2 is a block diagram of a computing device in which embodiments can be implemented.

FIG. 2 is an example computing device 200 in which embodiments of the present invention, or portions thereof, can be implemented as computer readable code. For example, components or modules of the system 100, such as browser 106, image processing system 110, etc., can be implemented in one or more computer systems 200 using hardware, software, firmware, tangible computer readable media having instructions stored thereon, or a combination thereof, and can be implemented on one or more computer systems or other processing systems.

Client 104 and/or web server 112 can include one or more computing devices 200. Client 104, web server 112, and image processing systems 110, can include one or more processors 202, one or more nonvolatile storage media 204, one or more memory devices 206, a communication infrastructure 208, a display device 210, and a communication interface 212. Processors 202 can include any conventional or special purpose processors including, but not limited to, digital signal processors (DSP), field programmable gate arrays (FPGA), and application specific integrated circuits (ASIC). GPU 214 is an example of a specialized processor that executes instructions and programs selected for complex graphics and mathematical operations in parallel.

A non-volatile storage device 204 can include one or more of: a hard disk, flash memory, and like devices, that can store computer program instructions and data on computer readable media. One or more nonvolatile storage devices 204 can be a removable storage device.

Memory devices 206 can include one or more volatile memory devices such as, but not limited to, random access memory (RAM). Communications infrastructure 208 can include one or more device-interconnect buses such as Ethernet, Peripheral Component Interconnect (PCI), and the like.

Typically, computer instructions are executed using one or more processors 202 and can be stored in non-volatile storage media 204, and memory devices 206. A display screen 210 allows results of computer operations to be displayed to a user or an application developer.

A communication interface 212 allows software and data to be transferred between a computer system 200 and external devices. A communication interface 212 can include a modem, a network interface (such as an Ethernet card), a communication port, a PCMCIA slot and card or the like. Software and data transferred via a communication interface 212 can be in the form of signals, which can be electronic, electromagnetic, optical, or other signals, capable of being received by a communication interface 212. These signals can be provided to a communication interface 212 via a communications path. The communication path can carry signals and can be implemented using wire or cable, fiber optics, a phone line, a cellular phone link, an RF link, or other communications channels.

Figure 3:
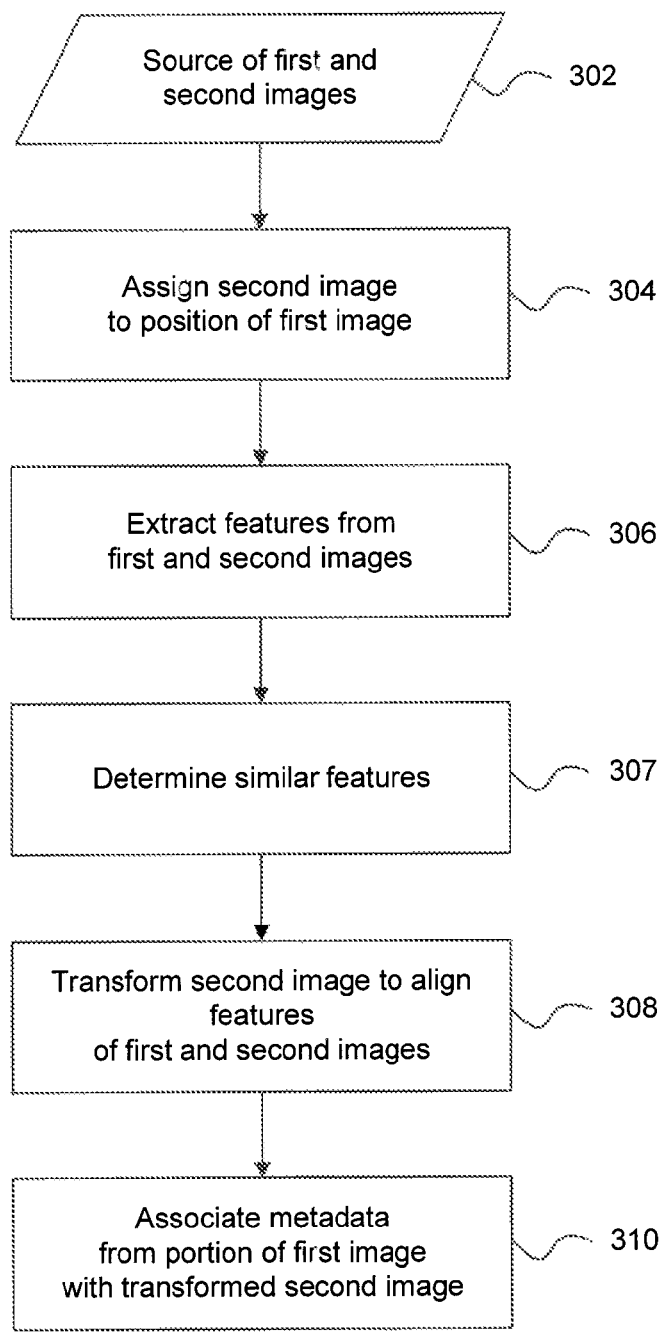
FIG. 3 is a flow chart illustrating a method for transferring information markers from a panoramic image to a related photo according to an embodiment.

FIG. 3 illustrates a computer-implemented method for transferring information markers from a panoramic image to a related matched image. A source of first and second images 302 can be provided. The first image can be a panoramic image with associated geolocation data, including latitude and longitude information and a depth map. The first image can also be provided with various metadata markers.

The second image can be a digital image, uploaded by a user, to be matched to a portion of the panorama. In the first stage 304, a corresponding portion of the first image is assigned to the second image using geolocation data based on corresponding geolocation data associated with the first and second images. There may be some misalignment between the second image and the corresponding portion of the first image due to the fact that the first and second images will generally have been taken by different cameras, from different angles, different camera positions, in different lighting conditions, etc. In embodiments, feature extraction techniques are applied to the second image and to the corresponding portion of the first image to identify pairs of matching features. Then the second image can be aligned with the corresponding portion of the first image by transforming the second image so as to align matching features.

In computer vision and image processing, the concept of feature detection and feature extraction refers to the process of identifying information in an image that is preserved under various transformations that can be applied to an image (e.g., scaling, stretching, rotation, flipping). For example, a corner of a window is recognizable in an image that has been stretched, flipped, rotated, etc. Other examples of features include edges, ridges, blobs, as well as more general "interest points." In general, features are subsets of the image domain and often take the form of isolated points, continuous curves, or connected regions. Feature detection is a low-level image processing operation in which pixels are examined individually or in groups or clusters to determine the presence of particular features.

A number of existing algorithms from the field of computer vision can be used to extract features from images. Example algorithms include: the Scale Invariant Feature Transform (SIFT), the Harris Interest Point Detector, and Maximally Stable Extremal Regions (MSER) to name a few.

A feature extraction algorithm can be carried out in stage 306 to extract features from the second image and from the corresponding portion of the first image using algorithms as discussed above. In stage 307 matching features in the second image and corresponding portion of the first image are determined.

In stage 308, the digital data representing the second image is transformed to align the second image with the corresponding portion of the first image. In an embodiment, the second image can be transformed using what is known as a "Homographic Transformation." A homography is an invertible transformation from a projective space (for example, the real projective plane) to itself that maps straight lines into straight lines. Synonyms for such a transformation include collineation, projective transformation, and projectivity. A Homographic Transformation is of interest because any two images of the same plane or surface in space are related by a homography (assuming a pinhole camera model).

The transformation of the second image is carried out to align the second image with the corresponding portion of the first image. The transformation is carried out so that the collection of features extracted in stage 306 from the second image is closely aligned with those matching from the first image. In other words, the transformation is carried out on the second image so that the extracted features of the second image are geometrically aligned with the similar features extracted from the portion of the first image, to within a predefined tolerance.

The transformation of the second image, in stage 308, generates a one-to-one correspondence between the coordinates in the second image and the coordinates in the portion of the first image. Upon establishing this correspondence, it becomes possible, in stage 310, to associate metadata with the transformed second image, from the corresponding portion of the first image. The correct placement of the metadata in the second image is determined by projection of the coordinates from the first image to the transformed second image according to the homography. Alternatively, metadata markers may also be placed in the second image based on their associated 3D coordinates (i.e., based on geolocation data combined with a depth map).

Figure 4:
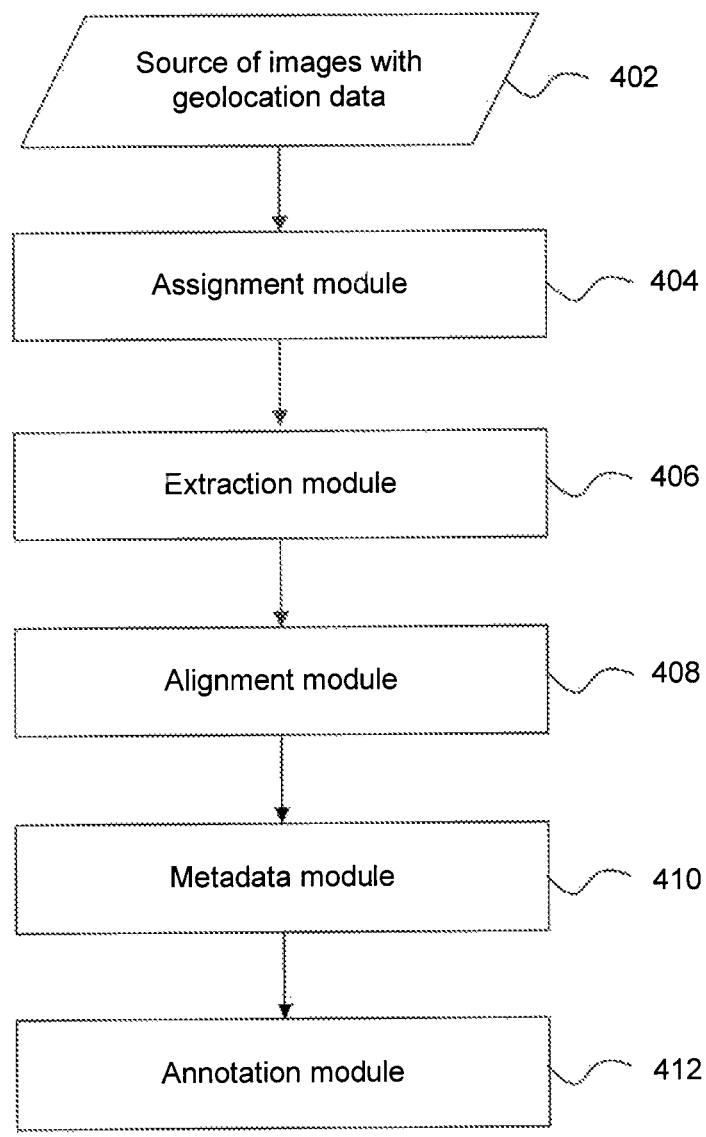
FIG. 4 is a computer-implemented system for transferring information markers from panoramic imagery to related photos according to an embodiment.

FIG. 4 illustrates a computer-implemented system for associating metadata from a first digital image with a second digital image. The system includes an assignment module 404, an extraction module 406, an alignment module 408, a metadata module 410, and an annotation module 412.

The assignment module is configured to take input from a source of images 402. A first image can be a panoramic image and a second image can be an image corresponding to a portion of the first image. The assignment module 404 is configured to assign a corresponding portion of the first image to the second image using geolocation data based on geolocation data. As discussed above, this is generally a rough alignment based on longitude and latitude coordinates and further refinement is typically required.

The extraction module 406 is configured to extract a collection of features associated with the second image and the corresponding portion of the first image. As discussed above, these features can be interest points, corners, curves, blob regions, etc.

The alignment module 408 is configured to align the second image with a portion of the first image by mathematically transforming the data representing the second image. The transformation alters the second image so that the features associated with the second image are geometrically aligned with the corresponding features of the portion of the first image, to within a predetermined tolerance. In some embodiments, the alignment can be carried out by the alignment module 408 using a Homographic Transformation.

The metadata module 410 is configured to associate metadata from the portion of the first image with the transformed second image. The metadata module 410 determines the correct placement of the metadata on the transformed second image by projecting the coordinates of the metadata in the first image to the transformed second image according to the homography.

The annotation module 412 is configured to annotate the second image with the associated metadata to generate an annotated image.

In further embodiments, the system can also include a display device 210 configured to receive input and to display the first image as a panorama, the transformed second image as a matched image aligned with a portion of the first image, and to display the metadata on the transformed second image. Further, the display device 210 can be configured to receive user input, and to control the way in which the first image, the transformed second image, and the metadata, are displayed based on the received input.

In further embodiments, system 400 can be configured to carry out the assignment, extraction, alignment, and metadata placement, in response to the receipt of the second image by the user input device. In other words, this system can be configured to operate automatically as a user uploads an image to be matched to the panorama.

Embodiments can also be directed to computer program products comprising software stored on any computer useable medium. Such software when executed in one or more data processing devices causes a data processing device to operate as described herein. Embodiments of the invention can employ any computer useable or readable medium. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, optical storage devices, MEMs, nanotechnological storage devices, etc.).

Typically, computer instructions are executed using one or more processors 202 and can be stored in a non-volatile storage medium 204 or memory device 206. Computer instructions can be stored on a client 104 or web server 112 in a compiled file, an executable file, or a shared library. Computer instructions can also be compiled on a client 104 or web server 112 prior to execution. Computer instructions can also be included in a routine, a subroutine, or layers of a software stack that are manipulated by processors 202.

Embodiments have been described above with the aid of functional building blocks illustrating the implementation of specific functions and relationships thereof. The boundaries of these functional building blocks have been arbitrarily defined herein for the convenience of the description. Alternate boundaries can be defined so long as the specific functions and relationships thereof are appropriately performed.

The foregoing description of the specific embodiments will so fully reveal the general nature of the invention that others can, by applying knowledge within the skill of the art, readily modify and/or adapt for various applications, such specific embodiments without undue experimentation, without departing from the general concept of the present invention. Therefore, such adaptations and modifications are intended to be within the meaning and range of equivalents of the disclosed embodiments based on the teachings and guidance presented herein. It is to be understood that the phraseology or terminology herein is for the purpose of description and not of limitation, such that the terminology or phraseology of the present specification is to be interpreted by the skilled artisan in light of the teaching and guidance presented herein.

The Summary and Abstract sections may set forth one or more but not all exemplary embodiments of the present invention as contemplated by the inventors, and thus, are not intended to limit the present invention and appended claims in any way.

The breadth and scope of the present invention should not be limited by any of the above described exemplary embodiments, but rather, should be defined only in accordance with the following claims and their equivalents.

What is claimed is:

1. A computer implemented method for associating metadata from a first image with a second image, comprising:
    assigning a corresponding portion of the first image to the second image using geolocation data;
    extracting a collection of features associated with the second image and the corresponding portion of the first image;
    aligning the second image with the portion of the first image by transforming the second image to geometrically align the collection of features of the second image with the corresponding collection of features of the portion of the first image;
    associating metadata from the portion of the first image with the transformed second image; and
    annotating the transformed second image with the associated metadata to generate an annotated image.

2. The method of claim 1, wherein the assigning comprises comparing geolocation data of the second image with geolocation data of the first image to determine an approximate match between the second image and the portion of the first image.

3. The method of claim 1, wherein the extracting comprises using computer vision techniques to extract features.

4. The method of claim 1, wherein the transforming comprises using a Homography transformation of the second image.

5. The method of claim 1, further comprising displaying the transformed second image along with the first image so that the transformed second image is aligned with a portion of the first image in terms of its orientation and placement with respect to latitude, longitude, and altitude.

6. The method of claim 1, further comprising displaying the transformed second image along with metadata from the first image, wherein the metadata is placed in the transformed second image according to three dimensional coordinates of latitude, longitude, altitude, and depth map.

7. A computer readable storage medium having program instructions stored thereon that, when executed by a processor, cause the processor to associate metadata from a first digital image with a second digital image, the program instructions comprising computer readable code that causes a computer to:
    assign the second image to a corresponding portion of the first image using geolocation data;
    extract a collection of features associated with the second image and the corresponding portion of the first image;
    align the second image with the portion of the first image by transforming the second image to geometrically align the collection of features of the second image with the corresponding collection of features of the portion of the first image;
    associate metadata from the portion of the first image with the transformed second image based on geolocation data associated with the metadata; and
    annotate the transformed second image with the associated metadata to generate an annotated image.

8. The computer readable storage medium of claim 7, wherein the program instructions further comprise computer readable code that causes the processor to compare the longitude and latitude of the second image with longitude and latitude data of the first image to determine an approximate match between the second image and the portion of the first image.

9. The computer readable storage medium of claim 7, wherein the program instructions further comprise computer readable code that causes the processer to use computer vision techniques to extract features.

10. The computer readable storage medium of claim 7, wherein the program instructions further comprise computer readable code that causes the processer to carryout Homography transformation of the second image to align the second image with the portion of the first image.

11. The computer readable storage medium of claim 7, wherein the program instructions further comprise computer readable code that causes the processer to display the transformed second image along with the first image so that the transformed second image is aligned with a portion of the first image in terms of its orientation and placement with respect to latitude, longitude, and altitude.

12. The computer readable storage medium of claim 7, wherein the program instructions further comprise computer readable code that causes the processer to display the transformed second image along with metadata from the first image, wherein the metadata is placed in the transformed second image according three dimensional coordinates of latitude, longitude, altitude, and depth map.

13. A computer implemented system for associating metadata from a first digital image with a second digital image, comprising:
    an assignment module configured to assign the second image to a corresponding portion of the first image using geolocation data;
    an extraction module configured to extract a collection of features associated with the second image and the corresponding portion of the first image;
    an alignment module configured to align the second image with the portion of the first image by transforming the second image to geometrically align the collection of features of the second image with the corresponding collection of features of the portion of the first image;
    a metadata module configured to associate metadata from the portion of the first image with the transformed second image based on geolocation data associated with the metadata; and
    an annotation module configured to annotate the transformed second image with the associated metadata to generate an annotated image.

14. The system of claim 13, wherein the assignment module is further configured to compare the longitude and latitude of the second image with longitude and latitude data of the first image to determine an approximate match between the second image and the portion of the first image.

15. The system of claim 13, wherein the extraction module is further configured to extract features using computer vision techniques.

16. The system of claim 13, wherein the alignment module is further configured to carry out a Homography transformation of the second image.

17. The system of claim 13, further comprising a display device configured to display the transformed second image along with the first image so that the transformed second image is aligned with a portion of the first image in terms of its orientation and placement with respect to latitude, longitude, and altitude.

18. The system of claim 17, further comprising a display device configured to display the transformed second image along with metadata from the first image, wherein the metadata is placed in the transformed second image according to three dimensional coordinates of latitude, longitude, altitude and a depth map.

19. The system of claim 18, further comprising:
    a user input device configured to receive input,
    wherein the display device is further configured to display the first image as a panorama, the transformed second image as a matched photograph aligned with a portion of the first image, and the metadata on the transformed second image, and
    wherein the display of the first image, transformed second image, and metadata, are determined by the received input.

20. The system of claim 19,
    wherein the user input device is further configured to receive the second image; and
    wherein the assignment, extraction, alignment, and metadata modules, are further configured to carry out their functions in response to the receipt of the second image by the user input device.

\* \* \* \* \*